(12) United States Patent
Richard (10) Patent No.: US 6,783,687 B2
(45) Date of Patent: Aug. 31, 2004

(54) METHOD AND APPARATUS FOR SEPARATING IONS FROM A FLUID STREAM

(76) Inventor: Gordon L. Richard, 4525 N. Independence Ave., Oklahoma City, OK (US) 73112

(*) Notice: Subject to any disclaimer, the term of this patent is extended or adjusted under 35 U.S.C. 154(b) by 103 days.

(21) Appl. No.: 10/269,298

(22) Filed: Oct. 11, 2002

(65) Prior Publication Data

US 2004/0031759 A1 Feb. 19, 2004

Related U.S. Application Data

(60) Provisional application No. 60/356,603, filed on Feb. 13, 2002.

(51) Int. Cl.[7] .................................................. C02F 1/48
(52) U.S. Cl. ..................... 210/695; 210/748; 210/223; 210/243; 210/416.1; 204/554; 204/557; 204/660; 204/664; 204/672
(58) Field of Search ................................ 210/695, 748, 210/223, 243, 416.1; 204/554, 557, 660, 664, 672, 673

(56) References Cited

U.S. PATENT DOCUMENTS

| | | |
|---|---|---|
| 3,693,792 A | 9/1972 | Lang |
| 3,719,583 A | 3/1973 | Ustick |
| 3,791,583 A | 2/1974 | Nunlist et al. |
| 4,238,326 A | 12/1980 | Wolf |
| 4,750,998 A | 6/1988 | Nakamur |
| 4,838,850 A | 6/1989 | Rosengart |
| 4,865,747 A | 9/1989 | Larson et al. |
| 4,891,140 A | 1/1990 | Burke, Jr. |
| 4,935,122 A | 6/1990 | Dreyfuss |
| 4,994,160 A | 2/1991 | Doevenspeck |
| 5,128,043 A | 7/1992 | Wildermuth |
| 5,288,401 A | 2/1994 | Rodriguez |
| 5,304,302 A | 4/1994 | Bossert |
| 5,453,188 A | 9/1995 | Florescu et al. |
| 5,647,401 A | 7/1997 | Nobori |
| 5,683,586 A | 11/1997 | Harcourt et al. |
| 5,725,778 A | 3/1998 | Cho et al. |
| 5,728,303 A | 3/1998 | Johnson |
| 5,837,143 A | 11/1998 | Mercier |
| 5,944,987 A | 8/1999 | Czarno |
| 5,997,812 A | 12/1999 | Burnham et al. |
| 6,165,339 A | 12/2000 | Ibbott |
| 6,203,710 B1 | 3/2001 | Woodbridge |
| 6,217,773 B1 | 4/2001 | Graham |
| 6,258,265 B1 | 7/2001 | Jones |
| 6,322,676 B1 | 11/2001 | Leddy et al. |
| 6,322,706 B1 | 11/2001 | Ohkawa |
| 6,460,974 B1 | 10/2002 | Lebron |
| 2004/0007452 A1 | 1/2004 | Warrent et al. |

FOREIGN PATENT DOCUMENTS

| | | | |
|---|---|---|---|
| AU | 61973 | 2/1967 | |
| DE | 3521109 | 12/1986 | |
| DE | 3521109 A1 * | 12/1986 | ........... B01D/57/00 |
| FR | 2629447 | 10/1989 | |
| WO | WO98/30501 | 7/1998 | |
| WO | WO98/30501 | 9/1998 | |
| WO | WO 03/048050 A1 | 6/2003 | |

* cited by examiner

Primary Examiner—David A. Reifsnyder
(74) Attorney, Agent, or Firm—Mary M. Lee (57) ABSTRACT

A method and apparatus for separating ions from a stream of fluid containing ions. A magnetic field and an electrostatic field are established across a processing zone through which the fluid stream flows so that the flow vector of the fluid stream, the flux lines of the magnetic field, and the vector of the electrostatic field are mutually orthogonal. The resulting high and low ion effluents may be further processed. No thermal input is required. No vacuum, reverse osmosis or reduced pressure distillation is involved. Large volumes of fluid may be processed at relatively low cost. The disclosed method and apparatus is suitable for desalinating seawater, or for removing arsenic or other contaminants from ground water, to produce potable water. Additionally, the invention permits the recovery of valuable constituents from ground or sea water; precious metals may be recovered from sea water and gypsum may be collected from ground water.

27 Claims, 6 Drawing Sheets

METHOD AND APPARATUS FOR SEPARATING IONS FROM A FLUID STREAM

This application claims the benefit of the filing date of provisional application serial No. 60/356,603, entitled "Desalination System Using Magnetic and Electrostatic Fields," filed Feb. 13, 2002, the contents of which are incorporated herein by reference.

FIELD OF THE INVENTION

The present invention relates to methods and devices for separating ions from a fluid stream.

BACKGROUND OF THE INVENTION

Seawater contains several salts, including sodium chloride (table salt), calcium chloride, calcium sulfate (gypsum), magnesium chloride, magnesium sulfate, potassium chloride (sulfite or so-called "light salt") and potassium sulfate. These salts are present in ions, including the cations sodium, potassium, magnesium, calcium, and the anions, chloride, bicarbonate and sulfate.

In addition to these major ions, seawater contains trace amounts of virtually every element found in nature, including gold, silver, platinum, manganese, lead, iron, and iodine. Some of these elements are intrinsically valuable, such as the precious metals. Others are useful in science and industry. Still others are toxic if consumed.

Accordingly, ion-separation systems are useful for producing desalinated or "low-ion" fresh water for drinking and irrigation. Ion-separation systems may be used to capture valuable elements, such as gypsum and precious metals. Still further, ion-separation systems may be used to remove toxic elements for water and other fluids.

While there are processes for separating ions from seawater and other fluid streams, there remains a need for an ion separation system which requires little positive energy input. There is a need for an ion separation system that requires no thermal input. There is a need for an ion separation system that can be adapted for a variety of purposes. Still further, there is a need for a system that can process large volumes at relatively low cost.

SUMMARY OF THE INVENTION

The present invention comprises an apparatus for separating ions from a fluid stream comprising one or more ionized salts. The apparatus comprises an electrically non-conductive and non-magnetic fluid conduit defining a fluid path for a fluid stream flowing therethrough. The conduit defines an influent path, a processing zone, a low-ion effluent path downstream of the processing zone, a cation effluent path downstream of the processing zone, and an anion effluent path downstream of the processing zone. The fluid path in the processing zone has a flow vector.

The apparatus further comprises a magnetic field generator adapted to establish a magnetic field across the processing zone of the conduit so that the flux lines of the generated magnetic field are generally perpendicular to the flow vector of the fluid path in the processing zone. Still further, the apparatus includes an electrostatic field generator adapted to establish a generally linear electrostatic field across the processing zone. The electrostatic field has a vector perpendicular to the flow vector of the fluid path in the processing zone and to the flux lines of the magnetic field.

The present invention further comprises a method for separating ions from a fluid stream. The method comprises flowing a fluid in a stream along a fluid path in a processing zone, the fluid path having a flow vector. The fluid stream in the processing zone is exposed to a magnetic field in which the flux lines are substantially perpendicular to the flow vector of the fluid path. Simultaneously, the fluid stream is exposed to a substantially linear electrostatic field perpendicular to the flow vector of the fluid path and to the vector of the flux lines of the magnetic field.

DETAILED DESCRIPTION OF THE PREFERRED EMBODIMENT(S)

Figure 1:
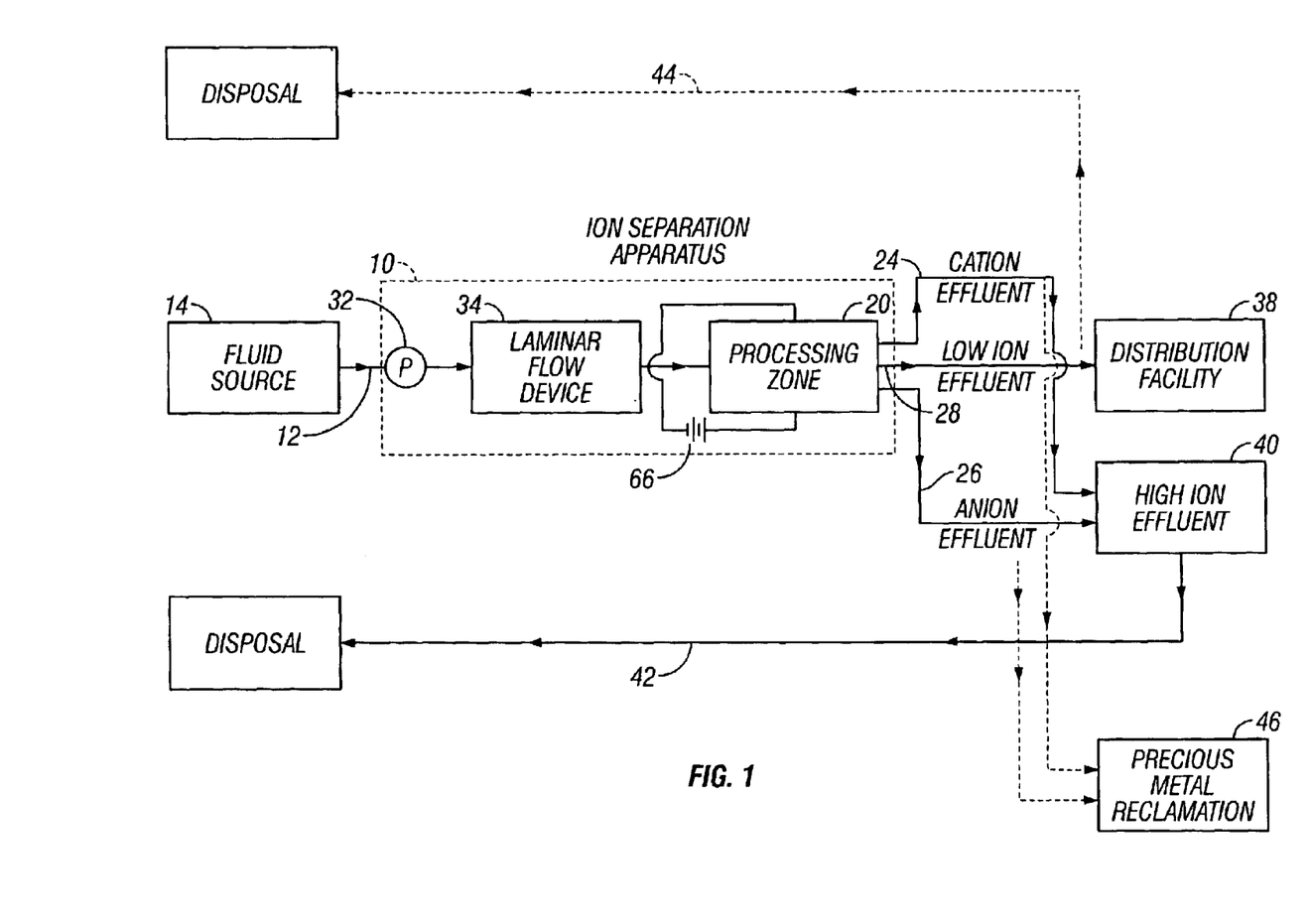
FIG. 1 is a flow diagram illustrating the apparatus and method of the present invention.

Turning now to the drawings in general and to FIG. 1 in particular, there is shown therein a system comprising an ion separation apparatus constructed in accordance with the present invention and designated generally by the reference numeral 10. The apparatus 10 is adapted to separate ions from a fluid stream 12 comprising one or more ionized salts.

As used herein "fluid" denotes any fluid, such as liquid, gas or flowable particulate matter, acting as a carrier for one or more salts in at least a partly ionized state. As used herein, "salt" is used to denote a compound or composition composed of molecules capable of dissociating in a solvent to form electrically charged ions, that is, cations (positively charged ions) and anions (negatively charged ions). The fluid may be an aqueous solution, but it need not be either water-based on a true solution.

The fluid stream 12 derives from a fluid source 14. The nature of the fluid source will depend on the fluid to be processed. In the embodiment described herein, the process is adapted to desalinate sea water. Accordingly, the fluid source 14 may be a source of sea water.

Figure 2:
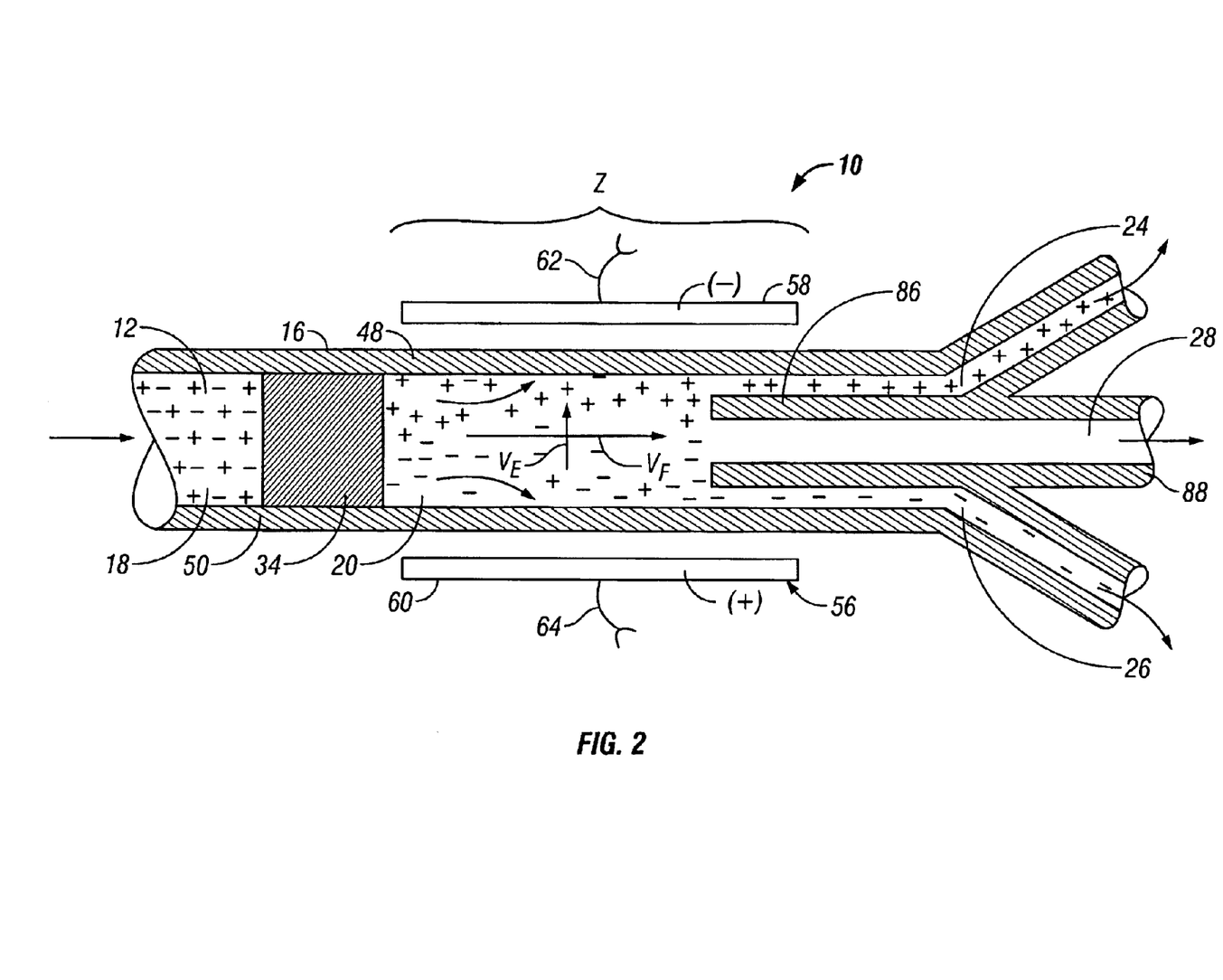
FIG. 2 is a partly sectional, fragmented plan view of the apparatus of the present invention illustrating the pattern of ion movement.

Referring still to FIG. 1 and now also to FIG. 2, the apparatus 10 comprises a fluid conduit 16 (FIG. 2) defining a fluid path for the fluid stream 12 flowing therethrough. The fluid conduit 16 preferably is formed of an electrically non-conductive, electrically transparent and non-magnetic material, such as acrylic, for reasons which will become apparent. As best seen in FIG. 2, the fluid conduit 16 includes an influent path 18 directing fluid 12 from the fluid source 14 (FIG. 1) into the apparatus 10. The conduit 16 further includes a processing zone 20 and indicated generally as "Z" in FIG. 2. Still further, the conduit 16 defines a cation effluent path 24, an anion effluent path 26 and a low-ion effluent path 28, all downstream of the processing zone 20.

As used herein, "low-ion effluent" means an effluent with a lower ion content than the influent stream. This term includes but is not limited to a stream that is ion free. For example, in the case of the exemplary desalination apparatus, the low-ion stream would have a salt (NaCl) content low enough to be potable, though it may not be entirely salt-free. As used herein, "anion effluent" means an effluent with more anions than cations. As used herein, "cation effluent" means an effluent with more cations than anions.

The fluid path in the processing zone 20 has flow vector indicated at $V_F$. In the embodiment shown, the flow vector $V_F$ of the fluid through the processing zone 20 is rectilinear. However, the invention is not so limited. In other embodiments, the flow vector of the fluid in the processing zone may be curvilinear, for example.

With continuing reference to FIG. 1, the ion separation apparatus 10 may comprise a pump 32 for driving the flow of the fluid stream through the conduit 16. This pump may be of any conventional type.

In some instances, it will be advantageous to stabilize the flow of the fluid stream, that is, to reduce the turbulence of the fluid before it passes through the processing zone. In these instances, a laminar flow device 34 may be included in the fluid conduit 16 of the apparatus 10 upstream of the processing zone 20, as illustrated in FIGS. 1 and 2. The nature and size of the laminar flow device may vary widely and will depend in part on the size of the conduit, the viscosity of the fluid, and the desired flow rate. For example, in some cases, the laminar flow device may be as simple as a stack of tubes nested in a honeycomb arrangement. However, other types of laminar flow devices may be employed.

Referring again to FIG. 1, the fluid in the low-ion effluent path 28 may be directed to a distribution system 38 for further distribution. For example, in the case of the exemplary desalination system, the potable water exiting the apparatus 10 in the low-ion effluent path 28 may be directed to a public water supply facility. In such systems, the cation effluent fluid and the anion effluent fluid may be recombined into a high-ion effluent 40 and conducted by a conduit 42 to a suitable disposal site.

In other systems, where the purpose is to recapture compounds in the cation and anion effluents, the low-ion effluent may be directed by the return conduit 44 to a disposal site, as illustrated in broken lines. The cation and anion effluent streams then may be directed to another facility for further processing.

For example, the cation and anion effluent streams may be directed to a precious metal reclamation center 46. Here, precious metals such as gold, silver and platinum, may be recovered from the effluent and reused. In such systems, it may be desirable to regulate the relative amounts of anion and cation effluent streams that are combined, as will be explained more fully below.

With continuing reference to FIG. 2, and referring now also to FIG. 3, the apparatus 10 will be described further. While the fluid conduit 16 may take various forms, in the preferred embodiment the cross-section shape of the conduit is rectangular or square. The conduit is formed by side walls 48 and 50 joined be a top wall 52 and a bottom wall 54.

The apparatus 10 further comprises an electrostatic field generator 56. The electrostatic field generator 56 is adapted to establish a generally linear electrostatic field across the processing zone 20. The generated electrostatic field has a vector $V_E$ generally perpendicular to the flow vector $V_F$ of the fluid stream therethrough.

In the preferred practice of the invention, the electrostatic field generator 56 comprises a pair of electrostatic plates.

More specifically, the electrostatic plates include a cathode electrostatic plate 58 and an anode electrostatic plate 60. The cathode plate 58 is an electrically insulated, negatively charged electrostatic plate 58 adjacent to the side wall 48 of the fluid conduit 16. Thus, the cathode plate 58 is on the same side of the fluid conduit as the cation effluent path 24. The anode plate 60 is an electrically insulated, positively charged electrostatic plate 60 adjacent to the side wall 50 of the fluid conduit 16 on the same side of the conduit as the anion effluent path 26 and opposing the cathode electrostatic plate 58. Even more preferably, the anode and cathode electrostatic plates 58 and 60 are formed of electrically conductive material and are electrically connected by wires 62 and 64 to a high voltage, low current DC power source, indicated schematically at 66 in FIG. 1, for energizing the electrostatic field generator 56. For example, the DC power source may be a high voltage electrostatic power supply indicated by the battery symbol at 66 in FIG. 1. The anode and cathode electrostatic plates 58 and 60 may be of metal, such as copper, titanium, copper, lead, zinc, or tin.

Figure 3:
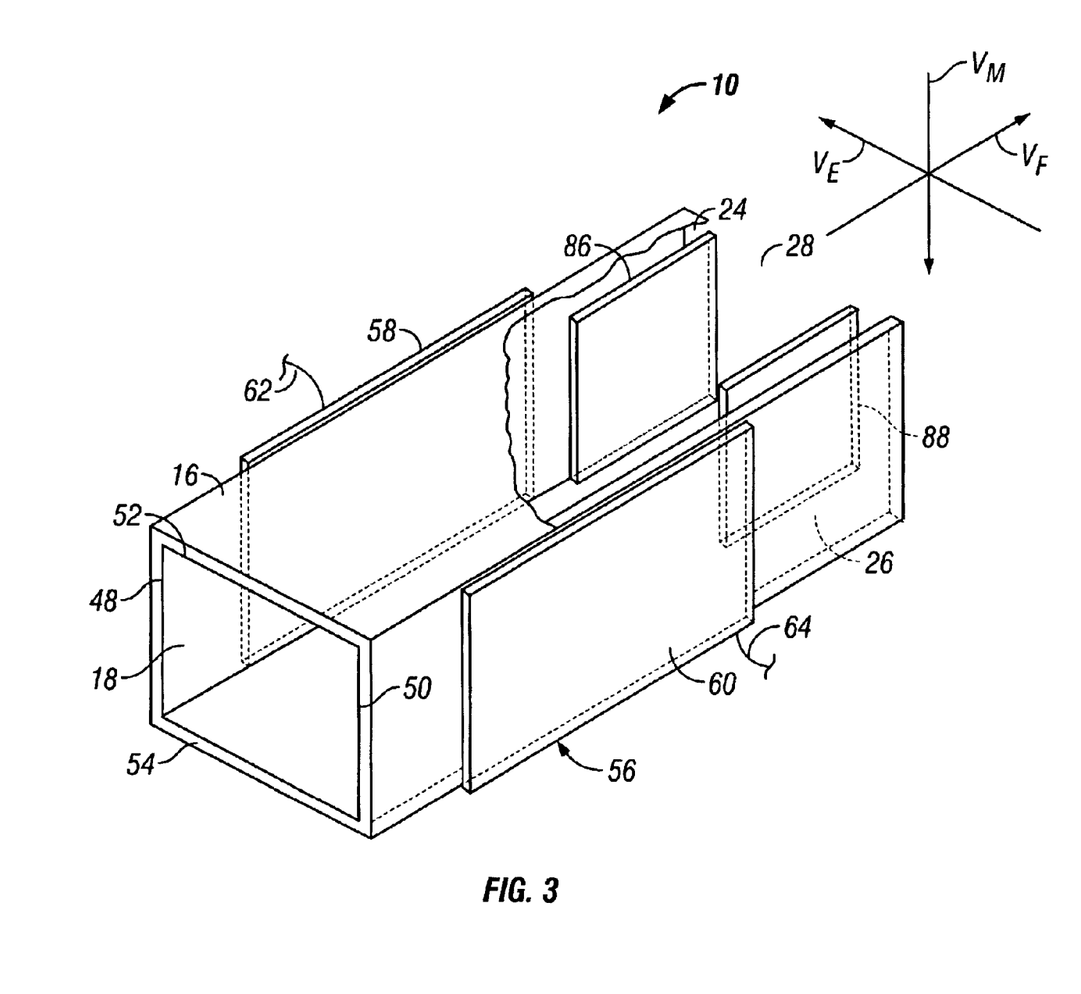
FIG. 3 is a perspective fragmented view of a portion of the apparatus illustrating placement of the anode and cathode electrostatic plates and the baffles.
Figure 4:
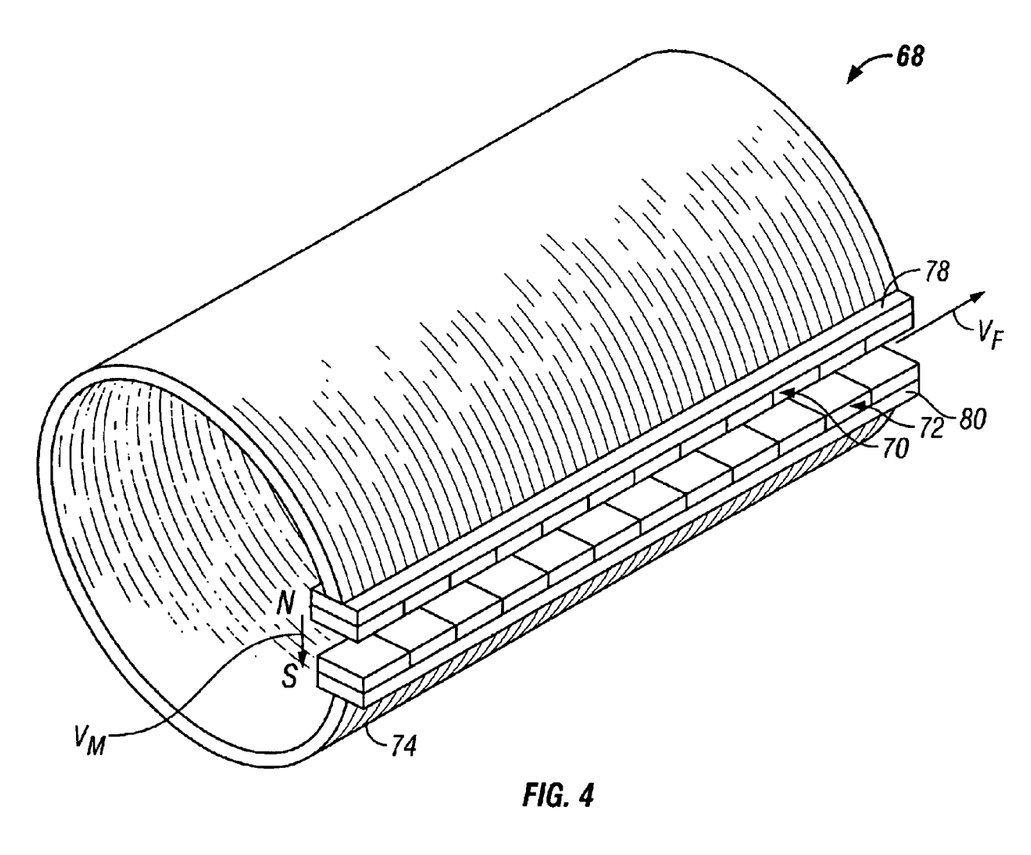
FIG. 4 is a perspective view of a magnetic field generator comprising a plurality of magnet pairs with a ferromagnetic yoke.

The apparatus 10 of the present invention also includes a magnetic field generator 68, shown in FIG. 4. The magnetic field generator 68 is adapted to establish a magnetic field across the processing zone 20 in the fluid conduit 16 (FIGS. 2 & 3). The magnetic field generator 68 is arranged to create a field in which the flux lines are generally perpendicular to the flow vector $V_F$ of the fluid path through the processing zone 20. Although the magnetic field generator 68 is not shown in FIG. 3, a line illustrating the direction of the flux lines of the magnetic field is illustrated therein and designated as $V_M$. As the vector illustration in FIG. 3 demonstrates, the flux lines $V_M$ of the magnet field, the flow vector $V_F$ of the fluid path, and the vector $V_E$ of the electrostatic field are mutually orthogonal.

The magnetic field generator 68 may comprise one or more permanent magnets, one or more electromagnets, or a combination of permanent and electromagnets. Various types of magnets are suitable for use in the present invention. Such magnets include cryogenically cooled superconductive electromagnets and high strength rare earth permanent magnets, such a Neodymium Iron Boron magnets.

Figure 5:
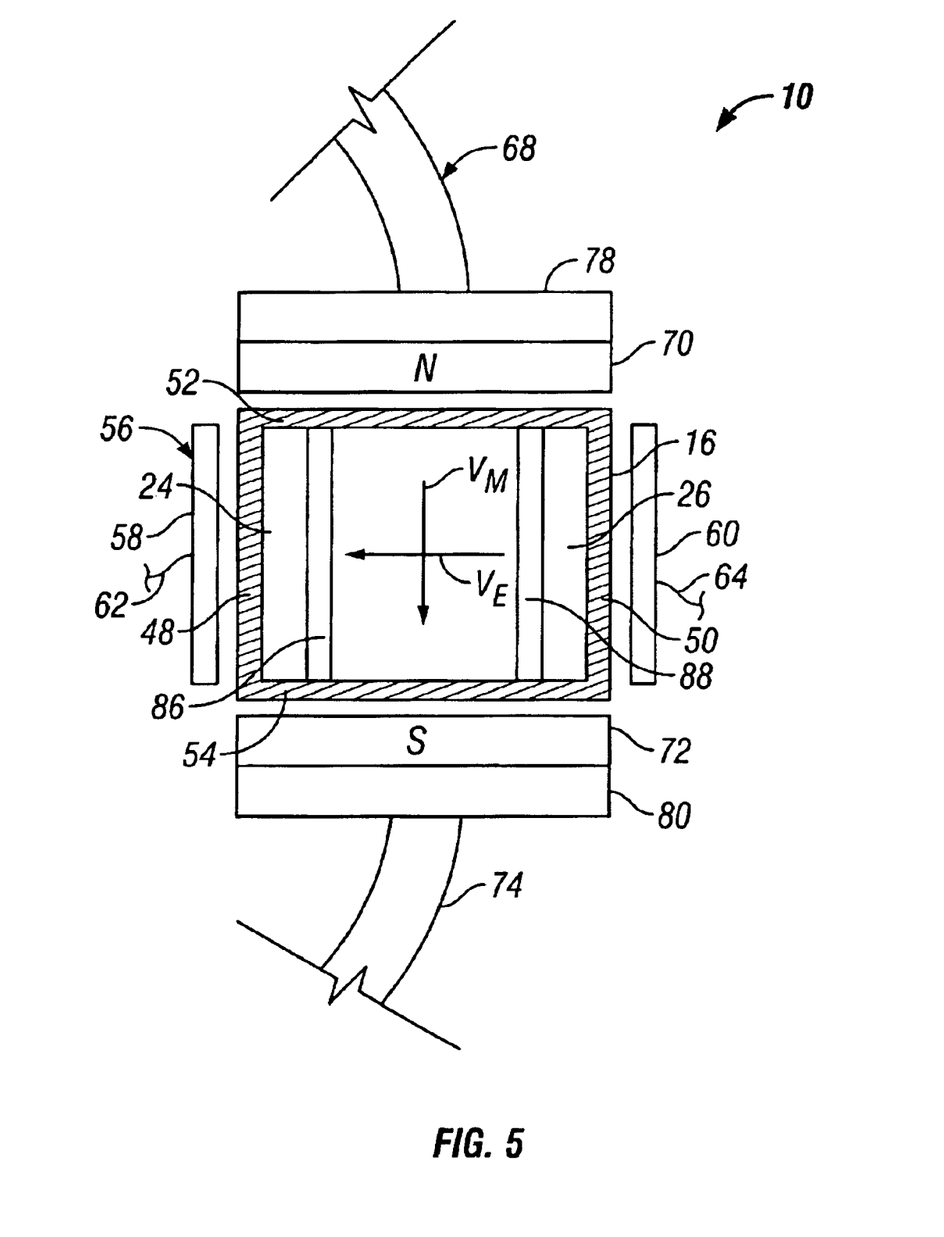
FIG. 5 is a fragmented, partly sectional, end elevational view of the apparatus.
Figure 6:
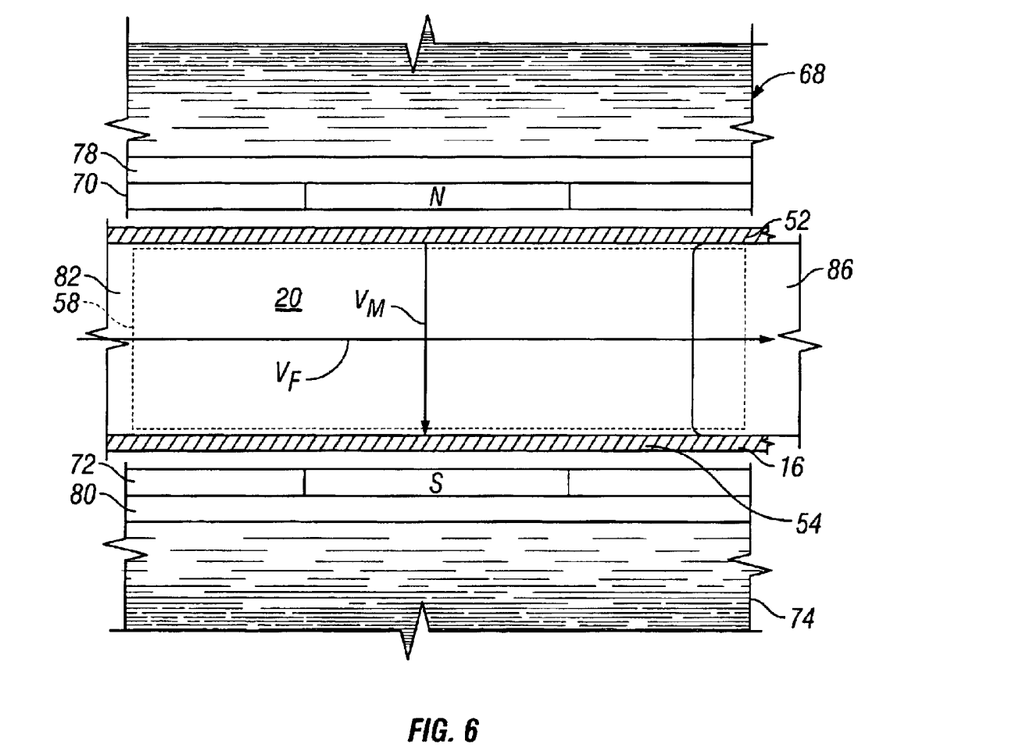
FIG. 6 is a fragmented, partly sectional, side elevational view of the apparatus.

In the preferred embodiment illustrated herein in FIGS. 4–6, the magnetic field generator 68 comprises a plurality of pairs of magnets forming two spaced apart rows 70 and 72. The magnets comprising the upper row of magnets 70 all are positioned with their North poles facing downwardly, as indicated by the "N" in FIGS. 4–6. The magnets comprising the lower row of magnets 72 all are likewise oriented so that their South poles are facing upwardly, as indicated by the "S" in FIGS. 4–65. The magnets preferably are Neodymium Iron Boron magnets.

The magnets are supported by a ferromagnetic yoke 74, as illustrated in FIG. 4, to which attention now specifically is directed. In this figure, only the yoke and magnet assembly are included to simplify the illustration. The cylindrical yoke 74 may be formed of a section of iron pipe with a longitudinal section removed to create the space 76 for the magnetic field between the spaced apart parallel edges. Preferably, two flat opposing strips or flanges 78 and 80 are fixed to the exposed edges of the yoke 74 to support the rows of magnets 70 and 72.

As indicated, the upper row of magnets 70 is arranged so that the North poles are exposed to the space 76, and the lower row of magnets 72 is arranged so that the South poles are exposed to the space 76. Thus, in each pair of opposing magnets, the magnets are positioned to produce a generally linear magnet field across the space 76. In the event electromagnets are used, the current should be unidirectional and maintained so as not to alternate the poles. In this way, the flux lines will project straight across the space 76 and through the fluid path, as described hereafter.

In this arrangement, the magnetic field vector is in the direction shown by the arrow $V_M$ in FIGS. 3 and 4. It is through the space 76 between the rows of magnets 70 and 72 that the processing zone 20 of the fluid conduit 16 extends, as best seen in the FIGS. 5 and 6.

The fragmented end view of FIG. 5 shows the orthogonal arrangement of the magnetic field $V_M$ of the magnetic field generator 68 and the electrostatic field $V_E$ of the electrostatic field generator 56. The fragmented side view of FIG. 6 illustrates the general direction of the flux lines of the magnetic field $V_M$ being generally perpendicular to the flow vector $V_F$ of the fluid stream through the processing zone 20.

In the embodiment described herein, the fluid flow vector and the electrostatic field are generally parallel to the horizontal and the flux lines of the magnetic field are generally vertical. However, it should be noted that this arrangement can be varied, so long as the three vectors are mutually orthogonal. For example, the electrostatic field could be vertical and the magnetic field could be horizontal. Alternately, the fluid flow could be angled downwardly to use gravity to aid in driving the fluid flow. In this case, the magnetic field and the electrostatic field would be angled as well, to be mutually perpendicular with the angled flow vector of the fluid. In other words, the magnetic and electrostatic fields are not gravitationally sensitive.

Having described the structure of the apparatus 10, the operation will be apparent. When fluid, such as sea water is passed through the processing zone 20 in the conduit 16 in the direction $V_F$, with the magnetic field oriented in the direction $V_M$, Lorentz forces cause the moving positively charged particles or cations to move toward the inside/cation wall 48 of the conduit, as illustrated in FIGS. 2 and 3. Similarly, the moving negatively-charged ions, the anions, will move toward the outside/anion wall 50 of the conduit 16.

In the embodiment shown, the magnetic field generator 68 is fixed against movement, or is stationary, relative to the fluid conduit 16 so that only the fluid moves relative to the conduit. It should be noted that in some application of this invention, the magnetic field generator 68 could be moveably mounted relative to the conduit to move in a direction opposite to the flow vector $V_F$ of the fluid stream passing through the processing zone 20 to further enhance the Lorentz effect. For example, a curved fluid conduit could be coupled with a circular array of magnets, in a carousel like configuration. The carousel of magnets would be rotated in a direction opposite to the fluid flow vector in the conduit. This and other configurations are well within the scope of this invention.

As the cations gather near the side wall 48 (FIG. 2), the positive charges of the cations will cause them to repel each other. Similarly, the like negative charges of the anions near the side wall 50 will cause mutual repulsion among the anions. Now it will also be appreciated that the ion separation movement caused by the magnetic field will be facilitated by energizing the electrostatic field in the direction of the $V_E$. This allows the electrostatic forces of the plates 58 and 60 to attract the cations to the cathode plate 58 and the anions to the anode plate 60. This will aid in keeping the ions of like charges together near the side walls of the conduit and facilitate their movement towards the adjacent effluent paths.

Referring still to FIG. 2, it will be understood that as the fluid continues to flow, the cations "hugging" the wall 48 will approach the cation effluent path 24 and the anions clinging to the wall 50 will approach the anion effluent path 26. This leaves the middle stream relatively free of ions and this low-ion stream will be directed toward the low-ion effluent path 28.

In the preferred embodiment, the electrostatic separation of the cation stream, the anion stream and the central low-ion stream may be enhanced by including structure dividers or baffles. These baffles preferably comprise a cation baffle 86 and an anion baffle 88. The cation baffle 86 is positioned to separate the cation effluent path 24 from the low-ion effluent path 28. The anion baffle 88 is positioned between the anion effluent path 26 from the low-ion effluent path 28.

The baffles 86 and 88 are parallel to each other and to the flux lines $V_M$ of the magnetic field, are aligned with the vector of the fluid flow $V_F$, and are orthogonal to the vector $V_E$ of the electrostatic field. In most cases, the baffles 86 and 88, like the fluid conduit 16, will be formed of electrically non-conductive, non-magnetic material.

Having described one preferred embodiment of the apparatus of the present invention, the method of the present invention now will be explained. As mentioned above, the present invention has many applications. One important application is the desalination of salt water. In this application, a source of salt water, such as sea water, first is selected. This source may be an ocean or a reservoir of sea water. Alternately, it may a reservoir of salt water from another source, such as oil and gas wells.

A fluid stream from the fluid source is caused to flow in a fluid path having a processing zone so that the fluid flow has a flow vector. A portion of the fluid stream in the processing zone is exposed to a magnetic field in which the flux lines are substantially perpendicular to the flow vector of the fluid. While the fluid flow is exposed to the magnetic field, the fluid simultaneously is exposed to an electrostatic force having a vector perpendicular to the vector of the flux lines of the magnetic field and mutually orthogonal to the flow vector of the fluid.

The magnetic field may be accomplished by using permanent or electromagnets. The fluid flow through the magnetic field creates a Lorentz force to cause the positive ions, such as the sodium ions, and the negative ions, such as the chloride ions, to move to opposite sides of the flow path. The electrostatic force keeps the like charged ions from mutually repelling each other and scattering apart. In some cases, the method of this invention will include causing the magnetic field to move in a direction opposite the flow of the fluid. This might be carried out, for example, by making the fluid flow path curved and mounting the magnets in a carousel like configuration for rotation counter to the curvilinear vector of the fluid flow.

In the preferred practice of this method, the fluid flow beyond the portion exposed to the electrostatic and magnetic fields is separated into an anion (e.g., chloride-$Cl^-$) effluent, a cation (e.g., sodium-$Na^+$) effluent and a low-ion effluent. In a desalination method, the low-ion effluent, having a substantially reduced salt content, may be distributed further as potable water for consumption or irrigation or other useful purposes.

The anion and cation effluents may be combined to form concentrated brine and returned to the fluid source. Alternately, the cation and anion effluents may be further processed to recover valuable constituents.

For example, precious metals, such as gold, silver and platinum, may be reclaimed from the briny high ion effluents. To that end, the cation effluent may be remixed with an amount of the anion effluent sufficient to react with the more reactive non-precious salt cations but insufficient to react with the less reactive precious metal cations, in a known manner. This permits the unreacted precious metal ions to settle out in the combined high-ion effluent as a recoverable metallic slime. This slime is further processed according to known methods to capture the selected metals.

In yet another application of the present invention, the method and apparatus described herein may be used to recover or remove gypsum from gyp water. Gypsum, or calcium sulfate ($CaSO_4$) is a valuable mineral used in manufacture of wall board, plaster, joint compound, cement, fertilizer, paint filler, and ornamental stone, to name a few. A reservoir of gyp water is the fluid source, and the high-ion effluent streams of calcium (cation) and sulfate (anion), which form a slurry, are further processed to make gypsum in a known manner. Alternately, ground water with a high gypsum content can be processed to reduce the gypsum content to render the water useable for agricultural purposes. Still further, arsenic compounds, such as arsenate ($H_2AsO_4^{-1}$ and $H_1AsO_4^{-2}$) oxyions, can be removed from arsenic contaminated ground water.

Changes can be made in the combination and arrangement of the various parts and steps described herein without departing from the spirit and scope of the invention.

What is claimed is:

1. An apparatus for separating ions from a fluid stream comprising one or more ionized salts, the apparatus comprising:
   an electrically non-conductive and non-magnetic fluid conduit defining a fluid path for a fluid stream flowing therethrough, wherein the conduit defines an influent path, a processing zone, a low-ion effluent path downstream of the processing zone, a cation effluent path downstream of the processing zone, and an anion effluent path downstream of the processing zone, and wherein the fluid path in the processing zone has a flow vector;
   a magnetic field generator adapted to establish a magnetic field across the processing zone of the conduit so that the flux lines of the generated magnetic field are generally perpendicular to the flow vector of the fluid path in the processing zone; and
   an electrostatic field generator adapted to establish a generally linear electrostatic field across the processing zone, the electrostatic field having a vector perpendicular to the flow vector of the fluid path in the processing zone and to the flux lines of the magnetic field.

2. The apparatus of claim 1 further comprising a pump for driving the flow of the fluid stream through the conduit.

3. The apparatus of claim 1 wherein the electrostatic field generator comprises an electrically insulated cathode electrostatic plate adjacent to and on one side of the fluid path through the processing zone and on the same side as the cation effluent path, and an electrically insulated anode electrostatic plate adjacent to and on the opposite side of the fluid path through the processing zone one the same side as the anion effluent path so as to oppose the cathode electrostatic plate.

4. The apparatus of claim 3 wherein the cathode electrostatic plate comprises a negatively-charged, non-magnetic, electrically conductive plate, and wherein the anode electrostatic plate comprises a positively-charged, non-magnetic, electrically conductive plate.

5. The apparatus of claim 4 wherein the electrically conductive plates are formed of a non-magnetic, electrically conductive material.

6. The apparatus of claim 5 wherein the electrically conductive plates are formed of metal.

7. The apparatus of claim 6 wherein the electrically conductive plates are formed of titanium, copper, lead, zinc, or tin.

8. The apparatus of claim 4 further comprising:
   an electrically non-conductive, non-magnetic anion baffle between the anion effluent path and the low-ion effluent path and in a plane parallel to the anode electrostatic plate; and
   an electrically non-conductive, non-magnetic cation baffle between the cation effluent path and the low-ion effluent path and in a plane parallel to the cathode electrostatic plate.

9. The apparatus of claim 1 further comprising an electrically non-conductive, non-magnetic anion baffle between the anion effluent path and the low-ion effluent path, and an electrically non-conductive, non-magnetic cation baffle between the cation effluent path and the low-ion effluent path.

10. The apparatus of claim 9 wherein the anion baffle and the cation baffle each comprises a plate orthogonal to the electrostatic field vector and in a plane parallel to the flux lines of the magnetic field and the flow vector.

11. The apparatus of claim 1 wherein the magnetic field generator comprises a first magnet assembly comprising a pair of magnets positioned on opposite sides of the processing zone.

12. The apparatus of claim 11 wherein the magnet field generator comprises a first ferrite yoke at least partially enclosing the first magnet assembly.

13. The apparatus of claim 12 wherein the magnetic field generator further comprises a plurality of magnet assembles comprising at least a second pair of magnets positioned on opposite sides of the processing zone downstream of the first magnet assembly providing first and second rows of magnets, wherein the poles of all the magnets in each row are uniformly oriented, and wherein the ferrite yoke encloses the plurality of magnet assemblies.

14. The apparatus of claim 1 further comprising a laminar flow device upstream of the processing zone.

15. The apparatus of claim 1 wherein the electrostatic field generator comprises a cathode electrostatic plate and an anode electrostatic plate, wherein the cathode electrostatic plate comprises a negatively-charged, non-magnetic, electrically conductive plate placed on the same side of the fluid conduit as the cation effluent path, and wherein the anode electrostatic plate comprises a positively-charged, non-magnetic, electrically conductive plate placed on the same side of the fluid conduit as the anion effluent path and opposing the cathode electrostatic plate, and wherein the apparatus further comprises:
   a pump for driving the flow of the fluid stream through the conduit;
   an anion baffle between the anion effluent path and the low-ion effluent path; and
   a cation baffle between the cation effluent path and the low-ion effluent path.

16. The apparatus of claim 1 wherein the magnetic field generator is adapted to generate a field that is stationary relative to the fluid conduit.

17. The apparatus of claim 1 wherein the flow vector of the fluid path through the processing zone is rectilinear.

18. A method for separating ions from a fluid stream, the method comprising:

flowing a fluid in a stream along a fluid path comprising a processing zone, the fluid flow path having a flow vector;

exposing the fluid stream in the processing zone to a magnetic field in which the flux lines are substantially perpendicular to the flow vector of the fluid path, while simultaneously exposing a the fluid stream to a substantially linear electrostatic field perpendicular to the flow vector of the fluid path and to the vector of the flux lines of the magnetic field.

19. The method of claim 18 further comprising:

separating the fluid stream beyond the processing zone into a low ion effluent, a cation effluent and an anion effluent.

20. The method of claim 19 further comprising:

harvesting precious metals from the cation and anion effluent.

21. The method of claim 18 further comprising:

recombining the cation and anion effluents to form a high-ion effluent.

22. The method of claim 21 further comprising:

processing the high-ion effluent to produce a precious metals slime.

23. The method of claim 22 further comprising:

reclaiming at least one precious metal ion from the precious metals slime.

24. The method of claim 23 further wherein the precious metal is gold, silver, or platinum.

25. The method of claim 18 further comprising:

re-mixing the cation effluent with an amount of the anion effluent sufficient to react with the more reactive non-precious salt cations but insufficient to react with the less reactive precious metal cations permitting the un-reacted precious metal ions to settle out in the re-mixed effluent as a recoverable metallic slime.

26. The method of claim 18 wherein the electrostatic field is held stationary relative to the fluid conduit.

27. The apparatus of claim 18 wherein the flow vector of the fluid path through the processing zone is rectilinear.

* * * * *